United States Patent [19]

Furuhashi et al.

[11] Patent Number: 5,334,678

[45] Date of Patent: Aug. 2, 1994

[54] BOTH ENDS-MODIFIED OLEFIN POLYMERS AND PROCESSES FOR THE PRODUCTION THEREOF

[75] Inventors: Hiroyuki Furuhashi; Naomi Koyama; Satoshi Ueki, all of Iruma, Japan

[73] Assignee: Tonen Corporation, Japan

[21] Appl. No.: 26,085

[22] Filed: Mar. 4, 1993

Related U.S. Application Data

[62] Division of Ser. No. 956,939, Oct. 5, 1992, abandoned, which is a division of Ser. No. 749,601, Aug. 26, 1991, abandoned.

[51] Int. Cl.$^5$ .................. C08F 110/02; C08F 110/06
[52] U.S. Cl. .................. 526/169.2; 526/336; 526/337; 585/506; 585/507
[58] Field of Search ............... 526/169.2, 336, 337; 585/506, 507

[56] References Cited

U.S. PATENT DOCUMENTS 4,999,409  3/1991  Doi et al. .................. 526/169.2

Primary Examiner—Joseph L. Schofer
Assistant Examiner—David Wu
Attorney, Agent, or Firm—Wenderoth, Lind & Ponack

[57] ABSTRACT

Polymers of olefins such as ethylene and propylene, having functional groups introduced into both the ends thereof, can be provided which are useful as macromonomers for polycondensation. This new polymer comprises a recurring unit represented by the general formula —(—CH$_2$.CHR—)— and having functional groups bonded to both the ends of the polymer and a number average molecular weight of 300 to 500,000, the functional groups being selected from the group consisting of H$_2$C=CH— group and

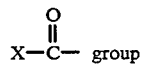

wherein X is —OH, —OR$^1$, a halogen atom or —SO$_3$R$^2$, R$^1$ is a hydrocarbon group of 1 to 5 carbon atoms and R$^2$ is a halogen-substituted or non-substituted hydrocarbon group of 1 to 20 carbon atoms.

6 Claims, No Drawings

BOTH ENDS-MODIFIED OLEFIN POLYMERS AND PROCESSES FOR THE PRODUCTION THEREOF

This application is a divisional of now abandoned application Ser. No. 07/956,939, filed Oct. 5, 1992, which is a divisional application of now abandoned Ser. No. 07/749,601, filed Aug. 26, 1991, now abandoned.

BACKGROUND OF THE INVENTION

1. Field of the Invention

This invention relates to ethylene or propylene polymers each having functional groups such as vinyl groups or carbonyl groups at both the ends thereof, and a process for the production of the same.

2. Description of the Prior Art

An ethylene polymer having a functional group introduced into one end of the polymer obtained by living anion polymerization of ethylene has been known, but an ethylene polymer having functional groups introduced into both the ends thereof has not been known.

Moreover, a method comprising polymerizing propylene using a polymerization catalyst consisting of a vanadium chelate compound and a dialkylaluminum halide and modifying the end of the resulting polypropylene with a functional group has been known, but only one end of tile polymer can be modified by the prior art method.

If functional groups can be introduced into both ends of polymers of olefins such as ethylene, propylene, etc., broad applications thereof can be expected to uses, e.g. macromonmomers of polycondensation.

SUMMARY OF THE INVENTION

It is an object of the present invention to provide an ethylene polymer having functional groups introduced into both the ends thereof.

It is another object of the present invention to provide an olefin polymer having vinyl groups introduced at both the ends thereof to be a precursor of the polymer having oxy groups or their derivatives introduced at both the ends thereof.

It is a further object of the present invention to provide a process for the production of an ethylene or propylene polymer into both the ends of which vinyl groups or carbonyl groups are introduced.

These objects can be attained by an olefin polymer comprising a recurring unit represented by the general formula $-(-CH_2.CHR-)-$ and having functional groups bonded to both the ends of the polymer and a number average molecular weight of 300 to 500,000, the functional groups being selected from the group consisting of $H_2C=CH-$ group and

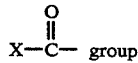
group wherein X is $-OH$, $-OR^1$, a halogen atom or $-SO_3R^2$, $R^1$ is a hydrocarbon group of 1 to 5 carbon atoms and $R^2$ is a halogen-substituted or non-substituted hydrocarbon group of 1 to 20 carbon atoms.

DETAILED DESCRIPTION OF THE INVENTION

The inventors have made various efforts to provide an olefin polymer having functional groups bonded to both the ends of the polymer and consequently, have found that an ethylene polymer having carbonyl groups introduced at both the ends thereof is obtained by polymerizing ethylene using a polymerization initiator consisting of a reaction product of an $\omega, \omega'$-diolefin compound and an organic lithium compound and a specified amine compound and then reacting with carbon dioxide, and that an olefin polymer having functional groups bonded to both the ends of the polymer can be synthesized by polymerizing ethylene or propylene in the presence of a reaction product of a polymerization catalyst consisting of a vanadium chelate compound and a dialkylaluminum halide with an $\alpha, \omega$-diolefin compound, and then reacting the product with the diolefin compound.

Accordingly, the present invention provides (1) an ethylene polymer comprising recurring units of $-(-CH_2.CH_2-)-$ and having

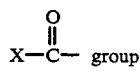
group bonded at both the ends thereof and a number average molecular weight of 300 to 300,000, wherein X represents $-OH$, $-OR^1$, a halogen atom or $-SO_3R^2$, $R^1$ represents a hydrocarbon group containing 1 to 5 carbon atoms and $R^2$ represents a halogen atom-substituted or non-substitut hydrocarbon group containing 1 to 20 carbon atoms, (2) an olefin polymer comprising recurring units represented by the general formula $-(-CH_2.CHR-)-$ and having $H_2C=CH-$ group bonded at both the ends thereof and a number average molecular weight of 300 to 500,000, wherein R is a hydrogen atom or methyl group, (3) a process for the production of the ethylene polymer as described in the above described (1), which comprises polymerizing ethylene in the presence of a dilithio compound formed by the reaction of a diolefin compound (I) represented by the general formula $H_2C=CR^3-R^4-CR^3=CH_2$ wherein $R^3$ represents a hydrocarbon group containing 1 to 10 carbon atoms and $R^4$ represents a divalent hydrocarbon group containing 1 to 20 carbon atoms with (II) an organolithium compound, and (III) a diamine compound represented by the general formula $R_2^6N-R^7-NR_2^6$ wherein $R^6$ represents a hydrocarbon group containing 1 to 5 carbon atoms and $R^7$ represents a divalent hydrocarbon group containing 1 to 10 carbon atoms, then reacting with carbon dioxide and with a proton donor or sulfonyl halide represented by the general formula $ZSO_2R^2$ wherein Z represents a halogen atom and $R^2$ have the same meaning as described above, (4) a process for the production of the ethylene polymer as described in the above described (1), which comprises polymerizing ethylene in the presence of a dilithio compound formed by the reaction of a diolefin compound (I) represented by the general formula $H_2C=CR^3-R^4-CR^3=CH_2$ wherein $R^3$ represents a hydrocarbon group containing 1 to 10 carbon atoms and $R^4$ represents a divalent hydrocarbon group containing 1 to 20 carbon atoms with (II) an organolithium compound, and (III) a diamine compound represented by the general formula $R_2^6N-R^7-NR_2^6$ wherein $R^6$ represents a hydrocarbon group containing 1 to 5 carbon atoms and $R^7$ represents a divalent hydrocarbon group containing 1 to 10 carbon atoms, then reacting with carbon dioxide, then with a proton donor and then with an alcohol represented by the general formula R¹OH wherein R¹ have the same meaning, or a thionyl halide, in particular, X being —OR¹ or a halogen atom, and (5) a process for the production of an olefin polymer as described in tile above described (2), which comprises polymerizing ethylene or propylene in the presence of a reaction product of a polymerization catalyst consisting of a xanadium chelate compound and a dialkylaluminum halide represented by the general formula R$^{1'}_2$AlX wherein R$^{1'}$ is an alkyl group containing 1 to 20 carbon atoms and X' is a halogen atom with an α, ω-diolefin compound represented by the general formula H$_2$C=CH—(—C$_m$H$_{2m}$—)—CH=CH$_2$ wherein m is 1 to 15, and then reacting with the diolefin compound and with a proton donor.

The olefin polymer of the present invention, as represented above, includes ethylene polymers when R is hydrogen atom and propylene polymers when R is methyl group, and generally has a number average molecular weight (Mn) 300 to 500,000, preferably 500 to 200,000.

In particular, the ethylene polymer of the present invention can be represented above, in which X is —OH, —OR¹, a halogen atom or —SO$_3$R². R¹ in —OR¹ is a hydrocarbon group containing 1 to 5 carbon atoms, preferably an alkyl group, more preferably methyl or ethyl group. The halogen atom includes chlorine, bromine, fluorine and iodine. R² in —SO$_3$R² is a hydrocarbon atom containing 1 to 20 carbon atoms, specifically an alkyl group, alkenyl group, cycloalkyl group, aryl group or aralkyl group each containing 1 to 20 carbon atoms. Above all, aryl groups and aralkyl groups are preferable and R² can be combined with an halogen atom such as chlorine, bromine, iodine or fluorine.

Examples of —SO$_3$R are as follows:

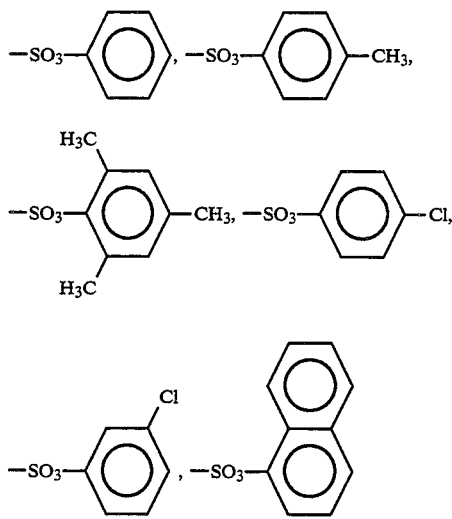

X is preferably —OH, —OC$_3$, —OC$_2$H$_5$, —Cl or

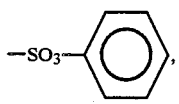

more preferably —OH or —OCH$_3$.

The ethylene polymer of the present invention has a number average molecular weight (Mn) of 300 to 300,000, preferably 600 to 150,000.

Preparation of Olefin Polymers (1) Reaction of Polymerization Catalyst with Diolefin Compound The polymerization catalyst consists of a vanadium chelate compound and a dialkylaluminum halide. The vanadium chelate compound is represented by the following general formula:

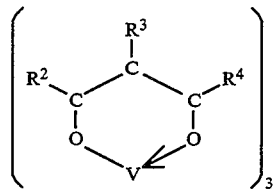

In this general formula, R$^{2'}$ to R$^{4'}$ represent hydrogen atoms or hydrocarbon groups of 1 to 8 carbon atoms, but at least one of R$^{2'}$ to R$^{4'}$ must be hydrogen atom and all of R$^{2'}$ to R$^{4'}$ must not be hydrogen atom.

Specific examples of the compound included in the above described general formula will now be illustrated.

Case where R$^{3'}$ is a hydrogen atom and R$^{2'}$ and R$^{4'}$ are hydrocarbon groups: R$^{2'}$/R$^{4'}$: CH$_3$/CH$_3$, CH$_3$/C$_2$H$_5$, C$_2$H$_5$/C$_2$H$_5$, CH$_3$/C$_6$H$_5$, C$_2$H$_5$/C$_6$H$_5$, C$_6$H$_5$/C$_6$H$_5$ CH$_3$/C$_6$H$_5$CH$_2$, C$_6$H$_5$CH$_2$/C$_6$H$_5$CH$_2$, C$_2$H$_5$/C$_6$H$_5$CH$_2$, C$_6$H$_5$/C$_6$H$_5$CH$_2$ Case where R$^{3'}$ is a hydrocarbon group and one of R$^{2'}$ and R$^{4'}$ is a hydrogen atom and the other is a hydrocarbon group:

R$^{3'}$/R$^{2'}$ or R$^{4'}$:CH$_3$/CH$_3$, C$_2$H$_5$/CH$_3$, CH$_3$/C$_2$H$_5$, C$_2$H$_5$/C$_2$H$_5$, C$_6$H$_5$/CH$_3$, CH$_3$/C$_6$H$_5$, C$_6$H$_5$/C$_2$H$_5$, C$_2$H$_5$/C$_6$H$_5$, C$_6$H$_5$/C$_6$H$_5$, C$_6$H$_5$CH$_2$/CH$_3$, CH$_3$/C$_6$H$_5$CH$_2$, C$_6$H$_5$CH$_2$/C$_6$H$_5$CH$_2$, C$_6$H$_5$CH$_2$/C$_2$H$_5$, C$_2$H$_5$/C$_6$H$_5$CH$_2$, C$_6$H$_5$CH$_2$/C$_6$H$_5$, C$_6$H$_5$/C$_6$H$_5$CH$_2$

Case where R$^{3'}$ is a hydrogen atom and one of R$^{2'}$ and R$^{4'}$ is a hydrogen atom and the other is a hydrocarbon group:

R$^{2'}$ or R$^{4'}$: CH$_3$, C$_2$H$_5$, C$_6$H$_5$, C$_6$H$_5$CH$_2$

Above all, the following compounds are preferable.

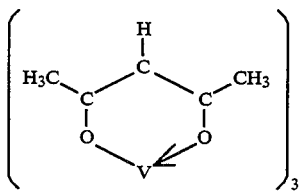

V(acetylacetonato)$_3$

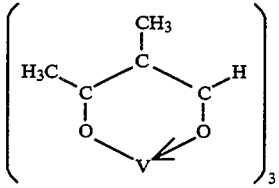

V(2-methyl-1,3-butanedionato)$_3$

-continued

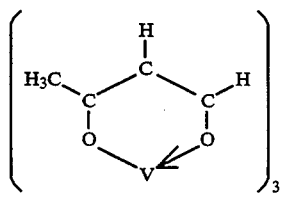

V(1,3-butanedionato)$_3$

Examples of the dialkylaluminum halide represented by the foregoing general formula are dimethylaluminum chloride, diethylaluminum chloride, diethylaluminum bromide, diethylaluminum iodide, diisobutylaluminum chloride and the like.

The proportion of the vanadium chelate compound and dialkylaluminum halide used is generally 1 to 1,000 moles of the dialkylaluminum halide per 1 mole of the vanadium chelate compound.

The $\alpha$, $\omega$-olefin compound is represented by the general formula, $H_2C=CH-(-C_mH_{2m}-)-CH=CH_2$ where m is 1 to 15.

Examples of the diolefin compound are 1,4-pentadiene, 1,5-hexadiene, 1,6-heptadiene, 1,7-octadiene, 1,8-nonadiene, 1,9-decadiene, 1,10-undecadiene, 1,11-dodecadiene, 1,13-tetradecadiene, 1,15-hexadecadiene, 1,17-octadecadiene and the like. The reaction of the polymerization catalyst with the diolefin compound is preferably carried out in a solvent being inert to the reaction and liquid during the reaction, illustrative of which are hydrocarbons such as propane, butane, pentane, hexane, heptane, toluene, etc.

The reaction is carried out at a temperature of $-50°$ C. or lower, preferably $-65°$ C. or lower for a period of time of 1 minute to 10 hours, preferably 5 minutes to 2 hours. The reaction proprotion of the polymerization catalyst and diolefin compound is controlled in such a manner that the vanadium compound in the polymerization catalyst is present in a proportion of 0.1 to 10 moles, preferably 0.5 to 2.0 moles per 1 mole of the diolefin compound.

(2) Polymerization of Olefins

The polymerization of olefins, in particular, ethylene or propylene is carried out in the presence of the reaction product obtained in the above described (1), preferably by feeding ethylene or propylene to the reaction system of the above described (1) and effecting the reaction at a temperature range similar to the above described (1) for a longer time than in the case of the above descirbed (1). When the reaction temperature is adjusted to $-65°$ C. or lower, in particular, there can be obtained a polymer having a Mw (weight average molecular weight)/Mn (number average molecular weight) of 1.05 to 1.5, near the monodisperse system. Furthermore, the yield and molecular weight of the polymer can be increased by lengthening the polymerization time.

(3) Reaction with Diolefin Compound

The reaction of the reaction product of the above described (2) with the diolefin compound is preferably carried out by feeding the diolefin compound to the reaction system of the above described (2) and effecting the reaction under the simialr reaction conditions to those of the above described (1).

(4) Reaction with Proton Donor

As the proton donor, there can be used water, alcohols, inorganic acids, etc. The alcohols include methanol, ethanol, propanol and the like and the inorganic acids include hydrochloric acid, nitric acid, sulfuric acid, and the like. The use of tie proton donor functions to release the polymerization catalyst and give proton through action on the ends of the polymer, thereby precipitating the polymer.

The reaction with the proton donor is generally carried out at a temperature of $-100°$ C. to $200°$ C., preferably $0°$ to $150°$ C. for 1 minute to 10 hours, preferably 0.1 to 2 hours. The proton donor is ordinarily used in a largely excessive amount.

Thus, the olefin polymer of the present invention can be produced and it can be assumed that the polymer has the following microstructure containing the skeleton of the diolefin compound and the alkyl group $R^{1'}$ of the dialkylaluminum halide, used in the production, because of adopting the above described production process.

$$A-(-CH_2.CHR-)_n-B$$

in which A and B are described below and n is an integer corresponding to the number average molecular weight:

| | A | B |
|---|---|---|
| ① | H$_3$C—CH—<br>      \|<br>     C$_m$H$_{2m}$<br>      \|<br>  H$_2$C=CH | —CH$_2$—CH—R$^{1'}$<br>        \|<br>       C$_m$H$_{2m}$<br>        \|<br>     CH=CH$_2$ |
| ② | CH$_2$—CH$_2$—<br>\|<br>C$_m$H$_{2m}$<br>\|<br>H$_2$C=CH | —CH$_2$—CH—R$^{1'}$<br>\|<br>C$_m$H$_{2m}$<br>\|<br>CH=CH$_2$ |
| ③ | H$_3$C—CH—<br>\|<br>C$_m$H$_{2m}$<br>\|<br>H$_2$C=CH | —CH—CH$_2$—R$^{1'}$<br>\|<br>C$_m$H$_{2m}$<br>\|<br>CH=CH$_2$ |
| ④ | CH$_2$—CH$_2$—<br>\|<br>C$_m$H$_{2m}$<br>\|<br>H$_2$C=CH | —CH$_2$—CH—R$^{1'}$<br>\|<br>C$_m$H$_{2m}$<br>\|<br>CH=CH$_2$ |
| ⑤ | H$_3$C—CH—<br>\|<br>C$_m$H$_{2m}$<br>\|<br>H$_2$C=CH | —CH—(CH$_2$)$_3$—R$^{1'}$<br>\|<br>C$_{m-2}$H$_{2(m-2)}$<br>\|<br>CH=CH$_2$ |
| ⑥ | CH$_2$—CH$_2$—<br>\|<br>C$_m$H$_{2m}$<br>\|<br>H$_2$C=CH | —CH—(CH$_2$)$_3$—R$^{1'}$<br>\|<br>C$_{m-2}$H$_{2(m-2)}$<br>\|<br>CH=CH$_2$ |

The olefin polymer of the present invention is then reacted with diborane and then with an alkali metal hydroxide and hydrogen pet-oxide to obtain a polymer hydroxylated at both the ends (—CH$_2$—CH$_2$OH).

A polymer having hydroxyl groups introduced at $\beta$-position of both the ends thereof $$(-\underset{\underset{OH}{|}}{CH}-CH_3)$$

can be obtained by reacting the olefin polymer of the present invention with sulfuric acid and water, or by reacting the same with mercuric acetate and water and then with sodium borohydride (NaBH₄).

Furthermore, the polymer hydroxylated in this way is reacted with a silane compound represented by the general formula, $R^{5'}{}_3SiY$ in which $R^{5'}$ is a hydrocarbon group containing 1 to 5 carbon atoms and Y is a halogen atom, to silyloxylate both the ends thereof [CH₂—CH₂OSiR⁵′₃ or —CH(OSiR⁵′₃)—CH₃], or is reacted with a carboxylic acid represented by the general formula, $R^{6'}COOH$ in which $R^{6'}$ is an alkyl group containing 1 to 5 carbon atoms, to esterify both the ends thereof

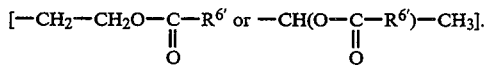

The hydroxylation, silyloxylation and esterification reactions of the polymer of the present invention will now be illustrated:

(5) Reaction with diborane

The reaction of the olefin polymer of the present invention with diborane is ordinarily carried out at 100° to 200° C. for 1 minute to 10 hours preferably in the presence of a solvent such as ethers. As the ether, there are preferably used those having a boiling point of at least 100° C., for example, aliphatic ethers such as di-n-butyl ether, di-s-butyl ether, di-n-amyl ether, di-i-amyl ether and the like.

The diborane is ordinarily used in the form of a solution in tetrahydrofuran in a proportion of 0.2 to 100 moles, preferably 0.5 to 20 moles to 1 mole of the whole amount of the diolefin compounds used in the foregoing (1) and (3).

(6) Reaction with alkali metal hydroxide and hydrogen peroxide

The reaction with an alkali metal hydroxide and hydrogen peroxide is generally carried out at 0° to 100° C. for 1 hour to 1 week. As the alkali metal oxide, there are generally used sodium hydroxide and potassium hydroxide, in general, in the form of aqueous solutions. The hydrogen peroxide is ordinarily used as its aqueous solution.

The alkali metal hydroxide and hydrogen peroxide are ordinarily used in excessive amounts, but it is sufficient to use them respectively in an amount of at least equimole to the diborane used in the foregoing (5).

Thus, the olefin polymer of the present invention can be obtained whose both ends are hydroxylated.

(7) Reaction with sulfuric acid and water

The reaction of the polymer of the present invention with sulfuric acid and water is ordinarily carried out in the presence of water or a mixture of water and ether at 80° to 150° C. for 1 minute to 10 hours.

(8) Reaction with mercuric acetate and water

The reaction of the polymer of the present invention with mercuric acetate and water is ordinarily carried out in the presence of a mixture of water and ether at 80° to 150° C. for 1 minute to 10 hours.

(9) Reaction with sodium borohydride

The reaction of the product obtained in the foregoing (8) with sodium borohydride can be carried out in the similar manner to the reaction method of (8).

(10) Reaction with silane compound and carboxylic acid

The silane compound used is represented by the general formula, $R^{5'}{}_3SiY$ in which $R^{5'}$ is a hydrocarbon group containing 1 to 5 carbon atoms, preferably methyl or ethyl group and Y is a halogen atom such as chlorine, bromine, fluorine or iodine.

The carboxylic acid is represented by the general formula, $R^6COOH$ in which $R^6$ is a hydrocarbon group containing 1 to 5 carbon atoms, preferably methyl or ethyl group.

The reaction of the dihydroxypolyolefin obtained in the foregoing (6), (7) or (9) with a silane compound or carboxylic acid can be carried out by the commonly used method in the case of trialkylsilylating or esterificating an alcohol.

For example, the reaction with the silane compound is ordinarily carried out initially at 0° to 50° C. for 1 minute to 5 hours and further at 100° to 150° C. for 1 to 10 hours, preferably in the presence of a solvent such as amine compounds. As the amine compound, there are most preferably used those having a boiling point of at least 100° C.

The esterification reaction can be conducted with either a carboxylic acid alone or in combination with a small amount of concentrated sulfuric acid or dried hydrogen chloride. Furthermore, a carboxylic halide can be used instead of the carboxylic acid.

The amount of the silane compound or carboxylic acid used is preferably at least 2 times by mole as much as the foregoing olefin polymer having hydroxyl groups at both the ends thereof.

Preparation of Ethylene Polymers (1) Reaction of Diolefin Compound (I) with Organolithium Compound The diolefin compound is represented by the general formula, $H_2C=CR^3—R^4—CR^3=CH_2$. In this formula, $R^3$ is a hydrocarbon group containing 1 to 10 carbon atoms, illustrative of which are alkyl, cycloalkyl, aryl and aralkyl groups, preferably alkyl and aryl groups. Examples thereof are alkyl groups such as methyl, ethyl, propyl, butyl, hexyl groups, etc. and aryl groups such as phenyl, tolyl, xylyl groups, etc.

$R^4$ is a divalent hydrocarbon group containing 1 to 20 carbon atoms, for example, substituents such as —(—CH₂—)$_m$— wherein m=1 to 12 and

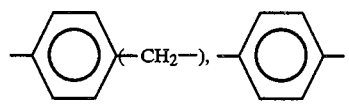

wherein r=1 to 6.

Examples of the compound (I) are 2,5-dimethyl-1,5-hexadiene, 2,5-diphenyl-1,5-hexadiene, 2,6-diphenyl-1,6-heptadiene, 2,7-diphenyl-1,7-octadiene, 2,7-dimethyl-1,7-octadiene, 1,2-bis[4-(1-phenylvinyl)phenyl]ethane, 1,4-bis[4-(1-phenylvinyl)phenyl]butane, 1,2-bis(isopropenyl-4-phenyl)ethane, 1,2-bis(isopropenyl-4-phenyl)butane and the like.

The organolithium compound (II) is a compound represented by the general formula $R^5Li$, in which $R^5$ is a hydrocarbon group containing 1 to 10 carbon atoms, preferably alkyl groups and aryl groups, more preferably alkyl groups.

As the compound (II), for example, there are used methyllithium, ethyllithium, n-propyllithium, i-propyllithium, n-butyllithium, i-butyllithium, s-butyllithium, t-butyllithium, n-pentyllithium, hexyllithium and the like.

The reaction of the compound (I) and the compound (II) is preferably carried out in the presence of an organic solvent. As the organic solvent, there are preferably used hydrocarbons, in particular, aliphatic hydrocarbons such as heptane, hexane and the like and aromatic hydrocarbons such as benzene, toluene and the like. Two or more organic solvents can be used.

The compound (I) and the compound (II) are used in a (II)/(I) molar ratio of 0.1 to 30, preferably 1 to 5. Both the compounds are reacted at $-50°$ C. to $+100°$ C., preferably $0°$ to $50°$ C. for 1 hour to 1 month, preferably 1 day to 10 days.

(2) Polymerization of Ethylene

The polymerization of ethylene is carried out in the presence of a dilithio compound formed by the reaction of the compounds (I) and (II) as described in the above described (1) and a diamine compound (III).

The diamine compound (III) is represented by the general formula, $R_2^6N-R^7-NR_2^6$ wherein $R^6$ is a hydrocarbon group of 1 to 5 carbon atoms, preferably alkyl group, illustrative of which are methyl, ethyl, n-propyl, i-propyl, n-butyl, i-butyl, s-butyl, t-butyl, n-pentyl and the like, methyl group being particularly preferable, and $R^7$ is a divalent hydrocarbon group of 1 to 10 carbon atoms, preferably a divalent hydrocarbon group represented by the general formula $-C_tH_{2t}-$ wherein $t = 1$ to 10.

Examples of the compound (III) are tetramethylethylenediamine, tetramethylpropylenediamine, tetramethyldiaminobutane, tetramethyldiaminopentane, tetramethyldiaminohexane, tetraethylenediamine and the like.

The polymerization of ethylene is preferably carried out in the presence of a solvent such as hydrocarbons, more preferably aromatic hydrocarbons such as benzene, toluene, xylene and the like.

The ratio of the dilithio compound and diamine compound (III) used is 0.1 to 20 moles, preferably 0.5 to 4 moles of the diamine compound (III) to 1 mole of the diolefin compound (I).

The polymerization of ethylene is generally carried out at a temperature of $-100°$ C. to $+100°$ C., preferably $-30°$ C. to $+30°$ C. for 1 hour to 1 month, preferably 10 hours to 1 week.

(3) Reaction with carbon dioxide

The reaction of the ethylene polymer formed in the above described (2) with carbon dioxide is generally carried out by feeding carbon dioxide to the reaction system of the above described (2) and bringing into contact with the polymer. The carbon dioxide is present in a proportion of 0.1 to 10,000 moles, preferably 2 to 100 moles to 1 mole of the diolefin compound (I). The carbon dioxide can be fed in the form of a mixture containing carbon dioxide.

The reaction is generally carried out by feeding carbon dioxide at a relatively low temperatrue, i.e. $-150°$ C. to $+50°$ C. preferably $-100°$ C. to $0°$ C. and then contacting them at a temperature of $-50°$ C. to $+100°$ C., preferably $0°$ to $50°$ C. for 0.1 to 100 hours, preferably 1 to 10 hours, for example, by employing stirring means, etc.

(4) Reaction with proton donor or sulfonyl halide

As the proton donor, there can be used water, alcohols, inorganic acids, etc. The alcohols include methanol, ethanol, propanol and the like and the inorganic acids include hydrochloric acid, nitric acid, sulfuric acid, and the like.

The sulfonyl halide is represented by the general formula, $ZSO_2R^2$ in which Z is a halogen atom such as chlorine, bromine, fluorine or iodine. $R^2$ in this formula have the same meaning as $R^2$ in a case where the substituent X of the foregoing ethylene polymer is $-SO_3R^2$. Therefore, as an example of the sulfonyl halide, there is such a compound that Z, i.e. a halogen atom is bonded to the above described $-SO_3R^2$.

The reaction with the proton donor or sulfonyl halide is generally carried out at $-100°$ C. to $+200°$ C., preferably $0°$ to $150°$ C. for 1 minute to 10 hours, preferably 0.1 to 2 hours.

The ethylene polymer of the present invention, in which

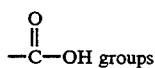
$-C-OH$ groups are introduced into both the ends thereof, is obtained by the reaction with the proton donor and that having

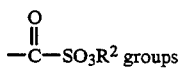
$-C-SO_3R^2$ groups introduced into both the ends thereof is obtained by the reaction with the sulfonyl halide.

(5) Reaction with alcohol or thionyl halide

The alcohol to be used is represented by the general formula, $R^1OH$ is which $R^1$ has the same meaning as described above. Thus, the particularly preferable alcohol is methanol or ethanol. As the thionyl halide, there can be used $SOCl_2$, $SO_2Cl_2$, $SOBr_2$, $SOI_2$, $SO_2Br_2$, $SO_2I_2$ and the like.

The reaction with the alcohol or thionyl halide is generally carried out at $-50°$ C. to $+200°$ C., preferably $50°$ to $150°$ C. for 1 minute to 1 week, preferably 1 hour to 1 day. The alcohol can either be used individually or in the form of an alcohol complex such as methanol . $BF_3$ complex.

The ethylene polymers of the present invention, in which

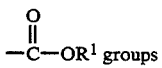
$-C-OR^1$ groups and

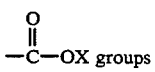
$-C-OX$ groups (X is a halogen atom) are respectively introduced into both the ends thereof, can be produced by reacting the product, obtained by reaction with the proton donor in the above described (4), respectively with the alcohol and with the thionyl halide.

It can be assumed that the polymer of the present invention, obtained in this way, has the following microstructure containing the skeleton of the diolefin compound and the substituent $R^5$ of the organolithium compound used in the production, because of adopting the above described production process.

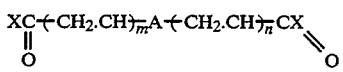

In the above described formula, A is represented as follows, and (m+n) is an integer corresponding to the number average molecular weight:

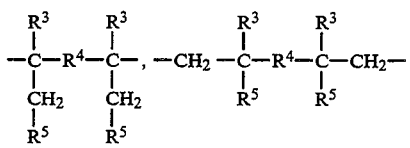

or

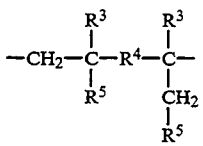

According to the process of the present invention, it is rendered possible to produce an olefin polymer whose both ends are modified with vinyl group and from the polymer of the present invnetion can readily be produced an olefin polymer whose both ends are modified with hydroxyl group or its substitued group.

This olefin polymer modified with hydroxyl groups can widely be used as macromonomers for polycondensation.

In addition, according to the process of the present invention, it is rendered possible to produce an ethylene polymer whose both ends are modified with a functional group having at least carbonyl group.

The ethylene polymer of the present invention, having the functional groups at both the ends thereof, can widely be used as macromonomers for polycondensation.

The following examples are given in order to illustrate the present invention in detail:

EXAMPLE 1

1000 ml of toluene was charged in a flask of 3000 ml, sufficiently replaced by nitrogen gas, and then cooled at $-65°$ C., to which 1.2 millimoles of 1,7-octadiene was added at the same temperature. 10 millimoles of Al($C_2H_5$)$_2$Cl and 1 millimole of V(2-methyl-1,3-butanedionato)$_3$ were then added thereto and stirred for 30 minutes. Further, 4.5 g of ethylene was introduced thereinto for 2 hours and 1.2 millimoles of 1,7-octadiene was then added thereto. After stirring for 10 minutes, the reaction solution was poured in ethanol and filtered to obtain a polymer having a number average molecular weight (Mn) of $4.9 \times 10^3$ measured by the GPC method with a yield of 4.3 g.

Measurement of the proton NMR of the above described polymer told a signal based on the proton of the terminal double bonds at 5.0 ppm and 5.8 ppm. The assignments thereof are as follows:

| δ (ppm) | Assignment |
|---------|------------|
| 5.0 | —CH=$\overline{CH_2}$ |
| 5.8 | —$\overline{CH}$=$CH_2$ |

From the intensity ratio of this signal and the peak of 1.3 ppm due to the ethylene polymer was obtained Mn of $4.6 \times 10^3$ assuming that vinyl groups were present at both the ends thereof. This value was substantially in agreement with that obtained by the GPC method. It was concluded therefrom that the thus obtained polymer was an ethylene polymer having vinyl groups at both ends thereof.

The above described polymer was added to 200 ml of n-butyl ether, to which a solution of diborane in tetrahydrofuran was added at room temperatrue while vigorously stirring and flowing nitrogen. The amount of the diborane added was 2.5 millimoles. After stirring for 1 hour at the refluxing temperature, the temperature was lowered and 200 ml of a 3N aqueous solution of sodium hydroxide and 200 ml of a 30% aqueous solution of hydrogen peroxide were added thereto, followed by stirring for 1 day. The resulting polymer was adequately washed with water, then washed with acetone and dried.

There was found a broad peak at 3300 to 3500 cm$^{-1}$ in the IR (infrared absorption spectrum) chart of the thus formed polymer, from which it was apparent that the polymer had hydroxyl group.

The above described ethylene polymer and 10 g of trimethylchlorosilane were added to 200 ml of pyridine, stirred at 25° C. for 1 hour and then refluxed for 4 hours. The resulting polymer was washed with methanol and then dried.

Measurement by proton NMR told a signal due to the proton of —Si(CH$_3$)$_3$ group at 0.08 ppm. From the intensity ratio of this signal and the peak of 1.3 ppm due to the ethylene polymer was obtained Mn of $5.5 \times 10^3$, which was substantially in agreement with that obtained from GPC. It was concluded therefrom that an ethylene polymer having trimethylsilyloxy groups at both the ends thereof was synthesized from the polymer. As a result of the IR analysis, a peak of 3300 to 3500 cm$^{-1}$ was not observed in the ethylene polymer having trimethylsilyloxy groups at both the ends thereof. Thus, it was concluded that the polymer before the reaction with trimethylchlorosilane was an ethylene polymer having hydroxyl groups at both the ends thereof.

EXAMPLE 2

1000 ml of toluene was charged in a flask of 3000 ml, sufficiently replaced by nitrogen gas, and then cooled at $-78°$ C., to which 0.6 millimole of 1,9-decadiene was added at the same temperature. 100 millimoles of Al($C_2H_5$)$_2$Cl and 20 millimoles of V(acetylacetonato)$_3$ were then added thereto and stirred for 30 minutes. Further, 1.5 g of ethylene was introduced thereinto for a period of 30 minutes and 0.6 millimoles of 1,9-decadiene was then added thereto. After stirring for 30 minutes, the reaction solution was poured in ethanol and filtered to obtain a polymer with a yield of 1.2 g.

Then, the hydroxylation reaction was carried out in an analogous manner to Example 1 except changing the amount of diborane in 1 millimole. When the resulting polymer was subjected to IR analysis, a broad peak was observed at 3300 to 3500 cm$^{-1}$. Measurement of the hydroxylated polymer by GPC told an Mn of $2.6 \times 10^3$.

EXAMPLE 3

Example 1 was repeated except introducing 1.5 g of ethylene for 30 minutes to synthesize an ethylene polymer of the present invention, leaving an Mn of $1.5 \times 10^3$, measured by proton NMR.

EXAMPLE 4

1000 ml of toluene was charged in a flask of 3000 ml, sufficiently replaced by nitrogen gas, and then cooled at $-78°$ C., to which 1.5 millimoles of 1,7-octadiene was added at the same temperature. 100 millimoles of $Al(C_2H_5)_2Cl$ and 20 millimoles of V(acetylacetonato)$_3$ were then added thereto and stirred for 30 minutes. Further, 35 g of propylene was added thereto and polymerized for 1 hour, to which 3.0 millimoles of 1,7-octadiene was then added. After stirring for 30 minutes, the reaction solution was poured in ethanol and filtered to obtain a polymer with a yield of 6.1 g.

Measurement of the proton NMR of the above described polymer told a signal based on the proton of the terminal double bonds at 5.0 ppm and 5.8 ppm.

From the intensity ratio of this signal and the peak of 0.7-1.7 ppm due to the propylene polymer was obtained Mn of $5.1 \times 10^3$ assuming that vinyl groups were present at both the ends thereof. When this polymer was subjected to GPC analysis, Mn was $6.0 \times 10^3$, from which it was concluded that the thus obtained polymer was a propylene polymer having vinyl groups at both the ends thereof.

The above described polymer was dissolved in 500 ml of tetrahydrofuran, to which a solution of diborane in THF was added at room temperatrue while vigorously stirring and flowing nitrogen. The amount of the diborane added was 3 millimoles. After stirring for 4 hours at room temperature, a 3N aqueous solution of sodium hydroxide and 30% aqueous solution of hydrogen peroxide were added thereto and further stirred for 1 day. The resulting polymer was washed with water, then washed with acetone and dried.

When the thus formed polymer was subjected to IR analysis, a broad peak due to hydroxyl group at 3300 to 3500 cm$^{-1}$ was observed. The number, average molecular weight, measured by GPC, was $4.8 \times 10^3$. When the reaction with trimethylchlorosilane was carried out in the similar manner to Example 1, the proton NMR of the resulting polymer showed a peak due to the hydrogen of the trimethylsilyl group at 0.08 ppm and a peak due to the proton of the propylene polymer at 0.7 to 1.7 ppm. From the intensity ratio of both the peaks was obtained an Mn of $5.6 \times 10^3$.

EXAMPLE 5

3 millimoles of 2,7-di(4-toluyl)-1,7-octadiene was dissolved in 25 ml of a mixed solution of similar volumes of heptane and toluene. This solution was added to 9 millimoles of s-butyllithium and stirred at room temperature for 5 days. A dilithio compound was precipitated from the reaction solution, filtered and washed with 25 ml of heptane. 200 ml of dried toluene was added to a reaction vessel of 500 ml, adequately replaced by nitrogen, to which 7 millimoles of tetramethylethylenediamine was further added. After cooling to 0° C., the above described dilithio compound was added thereto, to which ethylene was added with agitation. While supplementing ethylene so as to maintain the pressure of ethylene at 2 atm inside the reaction system, the mixture was stirred for 24 hours and an ethylene polymer was synthesized.

After exhausting the ethylene retained in the system, the mixture was cooled to $-78°$ C., into which dried carbon dioxide was introduced. While maintaining the internal pressure of carbon dioxide at 2 atm, the temperature was raised to room temperature, followed by stirring for 5 hours.

The product was poured in 10% HCl and the resulting precipitate was separated by filtration. The precipitate was extracted with hot toluene for 2 days, the toluene was cooled, the resulting product was filtered and dried, thus obtaining a polymer with a yield of 1.6 g and a number average molecular weight (Mn) of $1.5 \times 10^3$, measured by GPC. When this polymer was subjected to IR spectrum analysis, a peak due to carboxylic acid was observed at 1700 cm$^{-1}$. When the polymer was subjected to measurement of the proton NMR, there was found a broad peak due to the hydrogen of the carboxylic acid near 11 ppm.

An Mn of $1.7 \times 10^3$ was obtained from the intensity ratio of the peak of 1.3 ppm due to the ethylene polymer and the peak of 2.3 ppm due to the hydrogen of the methylene group adjacent to the carboxylic acid. This value was substantially in agreement with that obtained by GPC.

Thus, it was concluded from these results that an ethylene polymer having carboxylic groups at both the ends thereof could be synthesized.

EXAMPLE 6

1.5 g of the ethylene polymer having carboxylic groups at both the ends thereof, obtained in Example 5, was dissolved in 200 ml of xylene at 120° C., to which 8.3 ml of boron trifluoride-methanol complex was added. The resulting mixture was reacted by heating with refluxing for 6 hours, after which the solvent was removed under reduced pressure to obtain a product. When this product was subjected to measurement of IR spectrum, there were found peaks due to the ester linkage near 1740 cm$^{-1}$ and 1150 cm$^{-1}$.

Thus, it was concluded from these results that the ethylene polymer carboxylated at both the ends thereof was converted into an ethylene polymer methyl-esterified at both the ends thereof.

EXAMPLE 7

Example 5 was repeated except changing the polymerization time of ethylene in 72 hours to synthesize an ethylene polymer of the present invention. When the resulting polymer was subjected to measurement of the IR spectrum in an analogous manner to Example 1, there was observed a peak due to the carboxylic acid at 1700 cm$^{-1}$. The number average molecular weight, measured from the proton NMR, was $5.1 \times 10^3$.

What is claimed is:

1. A process for the production of an olefin polymer comprising recurring units of the formula —(—CH$_2$-CHR—)— and having a H$_2$C=CH— group bonded at both ends thereof and a number average molecular weight of 300 to 500,000, wherein R is a hydrogen atom or methyl group, which comprises polymerizing ethylene or propylene with a reaction product of a polymerization catalyst consisting of a vanadium chelate compound and a dialkylaluminum halide represented by the general formula R$^{1'}_2$AlX' wherein R$^{1'}$ is an alkyl group containing 1 to 20 carbon atoms and X' is a halogen atom with an $\alpha$, $\omega$-diolefin compound represented by the general formula H$_2$C=C—(—C$_m$H$_{2m}$—)—CH=CH$_2$ wherein m is 1 to 15, and then further reacting with the diolefin compound and with a proton donor.

2. The process as claimed in claim 1, wherein the chelate compound is selected from the group consisting of V(acetylacetonato)$_3$, V(2-methyl-1,3-butanedionato)$_3$ and V(1,3-butanedionato)$_3$.

3. The process as claimed in claim 1, wherein the dialkylaluminum halide is selected from the group consisting of dimethylaluminum chloride, diethylaluminum chloride, diethylaluminum bromide, diethylaluminum iodide, diisobutylaluminum chloride and mixtures thereof.

4. The process as claimed in claim 1, wherein the vanadium chelate compound and the dialkylaluminum halide are used in a proportion of 1 to 1,000 moles of dialkylaluminum halide to 1 mole of the vanadium chelate compound.

5. The process as claimed in claim 1, wherein the diolefin compound is selected from the group consisting of 1,4-pentadiene, 1,5-hexadiene, 1,6-heptadiene, 1,7-octadiene, 1,8-nonadiene, 1,9-decadiene, 1,10-undecadiene, 1,11-dodecadiene, 1,13-tetradecadiene, 1,15-hexadecadiene, 1,17-octadecadiene and mixtures thereof.

6. The process as claimed in claim 1, wherein the polymerization catalyst and the diolefin compound are reacted in a proportion of 0.1 to 10 moles of the vanadium compound in the polymerization catalyst to 1 mole of the diolefin compound.

* * * * *